United States Patent Office 3,632,755
Patented Jan. 4, 1972

3,632,755
METAL SALT COMPLEXES OF IMIDAZOLYL-PHOSPHONOTHIOATES
Cleve A. Goring and Robert L. Noveroske, Walnut Creek, Calif., assignors to The Dow Chemical Company, Midland, Mich.
No Drawing. Filed June 13, 1968, Ser. No. 738,724
Int. Cl. A01n 9/20, 9/36
U.S. Cl. 424—200
18 Claims

ABSTRACT OF THE DISCLOSURE

The present invention is directed to metal salt complexes of imidazolylphosphonothioates (alternatively named imidazolylphosphine sulfides), which complexes have the following formula

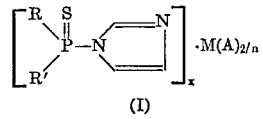

The present invention is also directed to methods employing and compositions comprising such complexes for the control of microorganisms, notably bacteria and fungi. In the above formula, R represents morpholino, piperidino, pyrrolidin - 1 - yl, 1,2,3,6 - tetrahydro - 1 - pyridyl, imidazol-1-yl, pyrazol-1-yl, 1,2,3-triazol-1-yl, 1,2,4-triazol-1-yl, or radical of the formula

wherein G represents alkyl and G' represents phenyl, benzyl, phenethyl, furfuryl, tetrahydrofurfuryl, 4-pyridylmethyl or alkyl such that G and G' taken together contain from 2 to 13 carbon atoms, inclusive; R' represents R, diallylamino, loweralkyl, cyclohexyl, phenyl, styryl, naphthyl, alkoxy, phenoxy or naphthoxy; M represents a divalent transition metal ion such as cadmium, cobalt, copper, iron, manganese or zinc; A represents a phytologically acceptable anion of valence $n$ and $x$ is an integer having the value of 1 to 4, inclusive.

BACKGROUND OF THE INVENTION

Various imidazolylphosphonothioates have been the subject of U.S. patents; see, for example, 3,111,525; 3,111,526; 3,264,179; and 3,323,990. In general, these imidazolylphosphonothioates have been taught to be active as fungicides.

However, it has been found that even those particular imidazolylphosphonothioates which seemed, on initial testing, to offer the most promise as fungicides are subject, in practice, to a severe disadvantage. More particularly, the effectiveness of these compounds against fungi is rapidly lost when used on living higher plants for the control of phytopathic fungi.

SUMMARY OF THE INVENTION

It has now been found that the disadvantages exhibited by prior art imidazolylphosphonothioates for the control of phytopathic fungi can be overcome by the use of novel metal salt complexes of the imidazolylphosphonothioates.

The new compounds of the present invention are metal salt complexes of the following formula

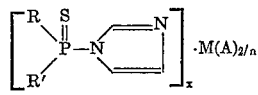

(I)

In this and succeeding formulas R represents morpholino, piperidino, pyrrolidin-1-yl, 1,2,3,6-tetrahydro-1-pyridyl, imidazol-1-yl, pyrazol-1-yl, 1,2,3-triazol-1-yl, 1,2,4-triazol-1-yl, or radical of the formula

wherein G represents alkyl and G' represents phenyl, benzyl, phenethyl, furfuryl, tetrahydrofurfuryl, 4-pyridylmethyl or alkyl such that G and G' taken together contain from 2 to 13 carbon atoms, inclusive; R' represents R, diallylamino, loweralkyl, cyclohexyl, phenyl, styryl, naphthyl, alkoxy, phenoxy or naphthoxy; M represents a divalent transition metal ion such as cadmium, cobalt, copper, iron, manganese or zinc; A represents a phytologically acceptable anion of valence $n$ and $x$ is an integer having the value of 1 to 4, inclusive.

It is among the advantages of the invention that a single application of the above metal salt complexes to higher plants gives excellent control of phytopathogenic bacteria and fungi over a long period of time. In addition, the complexes are typically crystalline solid substances, whereas the prior art imidazolylphosphonothioates are usually liquids. For this reason, also, the present metal salt complexes are distinguished over the prior art and are, as a consequence, easier to synthesize in a high degree of purity, more stable in storage, and easier to formulate and apply to loci subject to infestation by bacteria and fungi.

DESCRIPTION OF THE PREFERRED EMBODIMENTS

As noted foregoing, the metal salt complexes of the present invention are typically crystalline solid substances. They are readily prepared by reacting the uncomplexed imidazolylphosphonothioate:

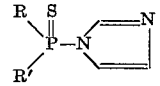

with a metal salt of the formula $$M(A)_{2/n}$$

thereby obtaining the desired metal salt complex. The reaction is preferably conducted in an inert liquid reaction medium. The identity of such medium is not critical; representative media include water and such organic liquids as the loweralkanols, acetone, the halogenated hydrocarbons, toluene, xylene, benzene and ether. The preferred medium for a given reaction is dependent upon the identity and solubility of the starting materials, especially the metal salt, and of the corresponding product. Thus, for example, a loweralkanol is preferred when each of the starting materials is soluble therein and the corresponding product is not. The metal halide complexes are typically prepared in this manner; and in general, this is the preferred method where suitable. Where either reactant is insoluble in the loweralkanols but soluble in water, or where the corresponding product is soluble in the loweralkanols but insoluble in aqueous media, it is preferred to mix an aqueous solution of the metal salt with a loweralkanol or acetone solution of the uncomplexed imidazolylphosphonothioate. In yet other instances, as when employing metal salts of mineral acids, it is preferred to dissolve the uncomplexed imidozolylphosphonothioate in an organic water-miscible solvent and to mix such solution with an aqueous solution of the metal salt.

Still another method for preparing the complexes is to dissolve uncomplexed imidazolylphosphonothioate in a water-immiscible organic solvent, such as chloroform, and shake vigorously with an aqueous solution of a metal salt. In this manner, the complex can be conveniently filtered as an insoluble product, generally from the aqueous fraction. Yet other methods include addition of undissolved metal salt, generally in excess, to an uncomplexed imidazolylphosphonothioate dissolved in an organic solvent and agitating the resulting mixture vigorously. After filtering to remove nonreacted metal salt, the organic solvent can be evaporated, leaving the desired complex, or the desired complex can be precipitated from the organic solvent by the addition of a co-solvent, such as ether, in which the addition product is insoluble. Similarly, where both starting materials and the resulting product are soluble in the reaction medium it is convenient to precipitate the product by the addition of a non-solvent for the complex, such as ether.

Yet another method of preparing alternative desired products involves anion exchange. Generally imidazolylphosphonothioate-metal halide complexes are prepared in solvent systems wherein the addition of a soluble salt of the same metal with a different anion caused a change in solubility, either increasing or decreasing, relative to the existing halide complex. In this manner metal complexes can be prepared comprising anions which might be otherwise difficult to obtain.

The exact amounts of the reactants to be employed are not critical, some of the desired metal salt complex being obtained when employing the reactants in any amounts. The reaction consumes the reactants in stoichiometric amounts, and the stoichiometry, in turn, is dependent upon the ratio of the complexing. The ratio of metal salt to imidazolylphosphonothioate varies, ranging at least from 1:1 to 1:4. In general, preparation of a particular ratio is favored by employment of the reactants in stoichiometric amounts; but mixtures are sometimes obtained, and in any instance, the exact ratio is not critical provided an actual complex results.

The reaction of metal salt and imidazolylphosphonothioate goes forward readily under a wide range of temperatures, such as from about 1° C. to 60° C.; but room temperatures are convenient and generally give good results.

In the present specification and claims, the terms "alkyl" and "alkoky" are employed to designate alkyl and alkoxy radicals containing from 1 to 12 carbon atoms and the term "loweralkyl" designates an alkyl radical containing from 1 to 4 carbon atoms, inclusive.

As above set forth, A represents a phytologically-acceptable anion. The primary attributes of such an anion are nontoxicity to plans and compatibility with plant growth processes. There may, of course, be other practical advantages to the employment of a particular anion, such as ease of separation of a particular metal salt complex due to the solubility effect of a given anion, enhanced activity from the particular anion, and the like. Specific anions which are phytologically-acceptable and which can serve as anion in the present metal salt complexes include (a) anions derived from mineral acids, notably bromide, chloride, fluoride, iodide, bromate, chlorate, sulfite, iodate, nitrate, monohydrogen phosphate, dihydrogen phosphate, carbonate and sulfate; and (b) anions derived from saturated or unsaturated organic acids, such as alkanoates of from 1 to 18 carbon atoms, including formate, acetate, propionate, butyrate, caproate, decanoate, stearate, oleate, and laurate; anions derived from organic dicarboxylic acids, such as those having up to 8 carbon atoms; anions derived from dithiocarbanic acids, such as the loweralkyldithiocarbamates, diloweralkyldithiocarbamates and alkylenebisdithiocarbamates; and anions derived from various other organic acids, such as salicylate, citrate, benzenesulfonate, 2-naphthalene-sulfonate, xanthate, and the like.

Several systems of nomenclature have been developed to name the organic phosphorus compounds. Thus certain of the compounds of the general Formula I above may be named as alkyl or aryl imidazolylphosphonamidothioates, others as imidazolylphosphondiamidothioates and yet others as substituted imidazolylphosphine sulfides. In the interest of simplicity and keeping in mind that all of the compounds are represented by the aforesaid general formula, the species of the invention will hereinafter be uniformly named as substituted imidazolylphosphine sulfides.

Specific embodiments of the present metal salt complexes follow in the examples which are illustrative and not to be construed as limiting.

EXAMPLE 1

Zinc chloride 1:1 complex with (diethylamino) diimidazol-1-ylphosphine sulfide (Diethylamino)diimidazol - 1 - ylphosphine sulfide (4.0 grams; 0.015 mole) was dissolved in 30 milliliters of anhydrous ethyl ether and the solution treated with 0.5 gram of decolorizing carbon, filtered and the ether removed by evaporation under subatmospheric pressure. The resulting purified (diethylamino)diimidazol-1-ylphosphine sulfide was then dissolved in 10 milliliters of methanol and a filtered solution of 2 grams of zinc chloride (0.015 mole) in 35 milliliters of methanol added slowly thereto, yielding almost immediately a white precipitate. The precipitate was separated by filtration, washed twice with methanol, and then permitted to air-dry. As a result of these operations, there was obtained the desired zinc chloride complex with (diethylamino) diimidazol-1-ylphosphine sulfide, a white powder melting with decomposition at 164°–6° C. Elemental analysis was conducted, the values found corresponding essentially with the theoretical values for a 1:1 complex. Infrared analysis was also conducted, the spectra showing expected deviations from the spectra of the corresponding uncomplexed substance.

EXAMPLE 2

Cupric sulfate 1:2 complex with bis(dimethylamino) imidazol-1-ylphosphine sulfide Bis(dimethylamino)imidazol-1-ylphosphine sulfide (3.0 grams; 0.0138 mole) was dissolved in 15 grams of acetone and filtered. To the resulting clear solution, there was added, portionwise over a period of time, a solution of 2.43 grams of cupric sulfate pentahydrate (0.0097 mole) in 15 milliliters of water. Addition of the solution resulted in precipitation of a substance which subsequently redissolved, leaving a deep blue solution. The reaction mixture was subjected to evaporation under subatmospheric pressure, yielding a deep blue viscous liquid. Addition of 5 milliliters of water and subsequent filtration yielded a green solid. This solid was suspended in acetone, filtered, dissolved in methanol, and subsequently separated by evaporation of the solvent under subatmospheric pressure.

As a result of these operations, there was obtained the expected cupric sulfate complex with bis(dimethylamio) imidazol-1-ylphosphine sulfide product; analysis showed values consistent with a 1:2 complex.

EXAMPLE 3

Cupric acetate 1:3 complex with bis(dimethylamino) imidazol-1-ylphosphine sulfide Bis(dimethylamino)imidazol-1-ylphosphine sulfide (3.0 grams; 0.0138 mole) was dissolved in 20 milliliters of chloroform and filtered. The filtered solution was shaken with 100 milliliters of water containing 1.9 grams of cupric acetate (0.0104 mole). The resulting deep blue solution was washed once with water using centrifugation to break an emulsion. Thereafter, solvent was removed by evaporation under subatmospheric pressure, yielding the desired cupric acetate complex with bis(dimethylamino) imidazol-1-ylphosphine sulfide product in the form of deep blue crystals. It was recrystallized from benzene. Elemental analysis values obtained were consistent with theoretical values for a 1:3 complexing ratio.

EXAMPLES 4–64

Other representative metal salt complexes are prepared in accordance with the above teachings and examples and are listed in the following table; in this table, the symbol "M.W." is employed as an abbreviation of the term molecular weight, and the symbol "M.P.," as an abbreviation of the term "melting point." The expression "dec." indicates that melting with decomposition occurred at the indicated temperature.

| Name of metal salt complex | Identifying characteristic |
|---|---|
| Cupric benzensulfonate 1:4 complex with bis(dimethylamino)imidazol-1-ylphosphine sulfide. | M.P. 174° C., dec. |
| Cupric chloride 1:2 complex with (dimethylamino)diimidazol-1-ylphosphine sulfide. | Blue powder. |
| Cupric chloride 1:2 complex with (N-benzyl-N-methylamino)diimidazol-1-ylphosphine sulfide. | Green powder. |
| Cupric bromide 1:2 complex with (diallylamino)diimidazol-1-ylphosphine sulfide. | Light blue crystals. |
| Manganese chloride 1:2 complex with (N-furfuryl-N-methylamino)diimidazol-1-ylphosphine sulfide. | M.P. 176–9° C. |
| Cupric butyrate 1:1 complex with bis(dimethylamino) imidazol-1-ylphosphine sulfide. | M.P. 105° C. |
| Cupric chloride 1:1 complex with (dimethylamino)(N-phenyl-N-methylamino) imidazol-1-ylphosphine sulfide. | M.P. 153.5–5.5° C. |
| Zinc chloride 1:2 complex with bis(dimethylamino)imidazol-1-ylphosphine sulfide. | Transparent crystal needles. |
| Cupric chloride 1:1 complex with bis(N-butyl-N-methylamino)imidazol-1-ylphosphine sulfide. | M.P. 165° C., dec. |
| Cupric chloride 1:1 complex with (N-butyl-N-methylamino)(diethylamino)imidazol-1-ylphosphine sulfide. | M.P. 175° C., dec. |
| Cupric bromide 1:1 complex with bis(diethylamino)imidazol-1-ylphosphine sulfide | M.P. 150–2° C. |
| Cupric sulfate 1:2 complex with (N-benzyl-N-methylamino)diimidazol-1-ylphosphine sulfide. | Blue powder. |
| Zinc Chloride 1:1 complex with (1,2,3,6-tetrahydro-1-pyridyl)diimidazol-1-ylphosphine sulfide. | M.P. 136–40° C. |
| Cupric chloride 1=1 complex with (diethylamino)(phenoxy)imidazol-1-ylphosphine sulfide. | M.W. 429. |
| Cobalt chloride 1:2 complex with (N-benzyl-N-methylamino)diimidazol-1-ylphosphine sulfide. | M.P. 180–1° C. |
| Cupric bromide 1:2 complex with (N-benzyl-N-methylamino)(pyrrolidin-1-yl)imidazol-1-ylphosphine sulfide. | M.P. 75° C., dec. |
| Zinc chloride 1:1 complex with (N-benzyl-N-methylamino)diimidazol-1-ylphosphine sulfide. | M.W. 453. |
| Cupric 2-hydroxy-1-naphthalenesulfonate 1:4 complex with bis(dimethylamino) imidazol-1-ylphosphine sulfide. | M.P. 165° C., dec. |
| Ferrous chloride 1:2 complex with (dimethylamino) diimidazol-1-ylphosphine sulfide. | M.P. 204–6° C., dec. |
| Ferrous chloride 1:2 complex with (diethylamino) diimidazol-1-ylphosphine sulfide. | M.P. 176–7° C., dec. |
| Cupric bromide 1:2 complex with (diethylamino) diimidazol-1-ylphosphine sulfide. | Blue-green powder; M.P. 177–8° C. |
| Manganese chloride 1:2 complex with (N-benzyl-N-methylamino)diimidazol-1-ylphosphine sulfide. | White powder. |
| Cupric chloride 1:2 complex with (N-furfuryl-N-methylamino)diimidazol-1-ylphosphine sulfide. | M.P. 140° C., dec. |
| Cupric chloride 1:2 complex with (N-butyl-N-methylamino)diimidazol-1-ylphosphine sulfide. | M.P. 145° C., dec. |
| Cupric bromide 1:2 complex with (N-benzyl-N-methylamino)diimidazol-1-ylphosphine sulfide. | M.P. 148–51° C. |
| Manganese chloride 1:4 complex with (dimethylamino)(pyrrolidin-1-yl)imidazol-1-ylphosphine sulfide. | M.P. 145–60° C. |
| Cupric chloride 1:1 complex with bis(dimethylamino)imidazol-1-ylphosphine sulfide. | Yellow powder. |
| Cupric chloride 1:1 complex with (dipiperidino)imidazol-1-ylphosphine sulfide. | M.P. 162.5–3.5° C. |
| Cupric chloride 1:2 complex with (N-benzyl-N-methylamino)phenylimidazol-1-ylphosphine sulfide. | M.P. 57–9° C. |
| Zinc chloride 1:1 complex with (dimethylamino)diimidazol-1-ylphosphine sulfide. | White powder. |
| Cupric chloride 1:1 complex with (diethylamino)(piperidino)imidazol-1-ylphosphine sulfide. | M.P. 151–3° C. |
| Cupric chloride 1:1 complex with bis(diethylamino)imidazol-1-ylphosphine sulfide. | Yellow crystals. |
| Cupric benzoate 1:1 complex with bis(dimethylamino)imidazol-1-ylphosphine sulfide. | M.P. 180° C., dec. |
| Cupric nitrate 1:4 complex with bis(dimethylamino)imidazol-1-ylphosphine sulfide. | M.P. 144–5° C., dec. |
| Zinc chloride 1:1 complex with (piperidino)diimidazol-1-ylphosphine sulfide. | M.P. 140–3° C. |
| Manganese chloride 1:2 complex with (N-butyl-N-methylamino)diimidazol-1-ylphosphine sulfide. | White powder, M.P. 188–90° C. |
| Manganese chloride 1:2 complex with bis(dimethylamino)imidazol-1-ylphosphine sulfide. | White granular solid, M.P. 140–2° C. |
| Cadmium chloride 1:2 complex with (N-benzyl-N-methylamino)diimidazol-1-ylphosphine sulfide. | M.P. 713–4° C. |
| Cupric chloride 1:1 complex with (pyrrolidin-1-yl)(piperidino)imidazol-1-ylphosphine sulfide. | M.P. 148° C. |
| Nickel sulfate 1:1 complex with bis(N-butyl-N-methylamino)imidazol-1-ylphosphine sulfide. | M.P. 92–2.5° C. |
| Cadmium iodide 1:2 complex with (N-benzyl-N-methylamino)diimidazol-1-ylphosphine sulfide. | M.P. 167–8° C. |
| Manganese sulfate 1:2 complex with (N-benzyl-N-methylamino)diimidazol-1-ylphosphine sulfide. | White crystals, M.P. 113–7° C. |
| Cupric chloride 1:1 complex with (diethylamino)(1,2,3,6-tetrahydro-1-pyridyl)imidazol-1-ylphosphine sulfide. | M.P. 167–9° C. |
| Zinc chloride 1:1 complex with (N-furfuryl-N-methylamino)diimidazol-1-ylphosphine sulfide. | M.P. 160–2° C. |
| Zinc iodide 1:1 complex with (N-benzyl-N-methylamino)diimidazol-1-ylphosphine sulfide. | White crystals, M.P. 172–3° C. |
| Zinc sulfate 1:2 complex with (N-benzyl-N-methylamino)diimidazol-1-ylphosphine sulfide. | M.W. 795. |
| Cupric chloride 1:1 complex with (dimethylamino)pyrrolidin-1-ylimidazol-1-ylphosphine sulfide. | M.P. 195–6° C. |
| Nickel fluoride 1:1 complex with (dimethylamino)(cyclohexyl)imidazol-1-ylphosphine sulfide. | M.W. 354. |
| Cobalt formate 1:1 complex with (ethoxy)diimidazol-1-ylphosphine sulfide. | M.W. 391. |
| Cupric bromide 1:1 complex with (diethylamino)styrylimidazol-1-ylphosphine sulfide. | M.W. 529. |
| Cadmium benzoate 1:1 complex with (N-(tetrahydrofurfuryl)(N-methylamino)diimidazol-1-ylphosphine sulfide. | M.W. 665. |
| Cupric chloride 1:1 complex with (diethylamino)(N(4-pyridylmethyl)-N-methylamino)imidazol-1-ylphosphine sulfide. | M.W. 457. |
| Cupric tartrate 1:1 complex with triimidazol-1-ylphosphine sulfide. | M.W. 475. |
| Cupric chloride 1:1 complex with (diethylamino)(morpholino) imidazol-1-ylphosphine sulfide. | M.W. 422. |
| Ferrous lactate 1:1 complex with (N-phenethyl-N-methylamino) (1,2,4-triazol-1-yl)imidazol-1-ylphosphine sulfide. | M.W. 566. |
| Cupric chloride 1:1 complex with (dimethylamino)pyrazol-1-ylimidazol-1-ylphosphine sulfide. | M.W. 375. |
| Cupric sulfate 1:1 complex with (diethylamino)(2-naphthoxy)imidazol-1-ylphosphine sulfide. | Blue solid, M.P. 133–6° C. |
| Manganese valerate 1:1 complex with bis(1,2,3-triazol-1-yl)imidazol-1-ylphosphine sulfide. | M.W. 523. |
| Zinc chloride 1:1 complex with (dimethylamino)(methyl)imidazol-1-ylphosphine sulfide. | M.W. 425. |
| Zinc stearate 1:1 complex with (dimethylamino)-(n-butoxy)imidazol-1-ylphosphine sulfide. | M.W. 879. |
| Cupric chloride 1:1 complex with (diethylamino)(2-naphthoxy)imidazol-1-ylphosphine sulfide. | Yellow solid, M.P. 96–99° C. |

As set forth hereinabove, the present metal salt complexes are particularly adapted to be employed for the control of those bacterial and fungal organisms ordinarily found on the aerial portions of plants, such as, for example, cherry leaf spot, apple scab, rice blast, powdery mildew, Helminthosporium (leaf spot on grasses, cereals, and corn), and late blight. The complexes can also be applied in dormant applications to the woody surfaces of plants or to orchard floor surfaces for the control of the overwintering spores of many fungi. In addition, the complexes can be applied to seeds to protect the seeds from the attack of bacterial and fungal organisms such as rot and mildew. Also, the complexes can be distributed in soil to control the organisms which attack seeds and plant roots, particularly the organisms of root rot and mildew.

In further operations, the complexes can be included in inks, adhesives, soaps, cutting oils, polymeric materials, or in oil or latex paints, to prevent mold, mildew, and the degradation of such products resulting from microbial attack. Also, the complexes can be distributed in textile or cellulosic materials, or can be employed in the impregnation of wood and lumber to preserve and protect such products from the attack of the microbial agents of rot, mold, mildew, and decay. The foregoing environments are merely illustrative of the many habitats in which these agents can be distributed to obtain excellent control of microorganisms.

It is an advantage of the present invention that compositions containing these complexes can be applied to growing vegetation in amounts required for effective control without significant injury to the plants. It is a further advantage that the complexes of the present invention are of very low toxicity to mammals. It is another advantage that a single application of the complexes will provide a residual and extended control of microorganisms, even on plants. Also, it is an advantage that the complexes are effective in eliminating established bacterial and fungal infestation as well as in providing residual and extended control against bacterial and fungal attack. Further, the complexes have been found to be translocated in plants and thus it is an advantage of the present invention that the complexes provide a systemic protection against the plant-attacking organisms. It is a yet further advantage that the complexes can be handled with a minimum of danger from accidental mammalian exposure thereto because of their low mammalian toxicity.

The methods of the present invention can be carried out with one or more of the unmodified metal salt complexes. However, the present invention also embraces the employment of a liquid, powder or dust composition containing one or more of the complexes. Such compositions are adapted to be applied to the living plants without substantial injury to the plants. In preparing toxicant compositions, the complexes can be modified with one or more of a plurality of additaments including organic solvents, petroleum distillates, water or other liquid carriers, surface active dispersing agents, and finely divided inert solids. In such compositions, the complexes oftentimes are present in a concentration of from about 2 to 98 percent by weight. Depending upon the concentration in the composition of the complexes such augmented compositions are adapted to be employed for the control of the undesirable fungi and/or bacteria or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

The exact concentration of the complex employed in the compositions for application to the fungal and bacterial organisms and/or their habitat can vary provided an effective antimicrobial dosage of toxicant is applied either on the organism or its environment. This dosage of toxicant is primarily dependent upon the susceptibility of the particular organism to the particular complex employed. In general, good results are obtained with liquid compositions containing from about 0.0001 to 2.0 percent by weight of toxicant; in some operations, however, compositions containing as much as from 2 to 98 percent by weight are conveniently employed, as for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the complexes are applied to plots of growing plants at a dosage of from 0.004 to 3 or more pounds per acre.

In the protection and preservation of inks, adhesives, cutting oils, paints, textiles, and paper, good results are obtained when the complexes are incorporated in such products in the amount of at least 0.0001 percent by weight. In the preservation of wood, excellent results are obtained when the complexes are incorporated by conventional treatment in the wood in the amount of at least 0.0001 pound per cubic foot of wood.

In the preparation of dust compositions, the toxicant products can be compounded with any of the finely divided solids such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents, such as fuller's earth, bentonite, attapulgite and other clays. Depending upon the proportions of ingredients these dust compositions can be employed for the control of fungi or employed as concentrates and subsequently diluted with an additional solid surface-active dispersing agent or with pyrophyllite, chalk, talc, gypsum, and the like to obtain the desired amount of active ingredient in a composition adapted to be employed for the control of fungi. Also, such dust compositions, when employed as concentrates, can be dispersed in water, with or without the aid of dispersing agents, to form spray mixtures.

Further, the complexes or a liquid or dust concentrate composition containing the same can be incorporated in intimate mixture with surface-active dispersing agents such as non-ionic emulsifying agents to form spray compositions. Such compositions are readily employed for the control of fungi and bacteria or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the nonionic emulsifiers such as the condensation products of alkylene oxides with the inorganic acids, polyoxyethylene derivatives or sorbitan esters, complex ether alcohols and the like. Suitable organic liquids which can be employed in the composition include liquid halo-hydrocarbons, petroleum oils and distillates, toluene, and synthetic organic oils. The surface-active dispersing agents are usually employed in liquid compositions in the amount of from 0.1 to 20 percent by weight of the combined weight of the dispersing agent and active compound.

When operating in accordance with the present invention, the complexes or a composition containing the complexes can be applied to the microorganisms to be controlled, or to their habitats in any convenient fashion, e.g., by means of hand dusters or sprayers. Applications to the above-ground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be applied from airplanes.

In other operations, the complexes can be dispersed in an atmosphere, particularly within a space temporarily or permanently enclosed such as a greenhouse, railroad car, or the like, to control fungal and bacterial organisms therewithin, to protect contents exposed to the atmosphere, and to control air-borne forms such as spores and the like. In these operations, a complex can be used as an aerosol, that is, incorporated with a propellant and, if desired, a cosolvent, and the resulting composition released from a pressure container into the atmosphere.

The following examples further illustrate the present invention

EXAMPLE 65

50 parts by weight of zinc chloride 1:1 complex with (diethylamino)diimidazol-1-ylphosphine sulfide are mixed and ground with 18 parts of diatomaceous earth, 24 parts of a hydrous aluminum silicate, 6 parts of sodium alkyl aryl sulfonate, and 2 parts of a substituted benzoic alkyl sulfonic acid to prepare a wettable powder composition which can be used in accordance with the foregoing teachings. In a similar manner, other compositions are prepared by employing one of the following in place of the zine chloride 1:1 complex with (diethylamino)diimidazol-1-ylphosphine sulfide: cuprous acetate 1:3 complex with bis(dimethylamino)imidazol-1-ylphosphine sulfide, cupric benzenesulfonate 1:4 complex with bis(dimethylamino)imidazol-1-ylphosphine sulfide, cupric chloride 1:2 complex with (dimethylamino)diimidazol-1-ylphosphine sulfide, cupric chloride 1:2 complex with (N-benzyl-N-methylamino)diimidazol-1-ylphosphine sulfide, cupric bromide 1:2 complex with (diallylamino)diimidazol-1-ylphosphine sulfide, manganese chloride 1:2 complex with (N-furfuryl-N-methylamino)diimidazol-1-ylphosphine sulfide, cupric butyrate 1:1 complex with bis(dimethylamino)imidazol-1-ylphosphine sulfide, cupric chloride 1:1 complex with (dimethylamino)(N-phenyl-N-methylamino)imidazol-1-ylphosphine sulfide, zinc chloride 1:2 complex with bis(dimethylamino)imidazol-1-ylphosphine sulfide, cupric chloride 1:1 complex with bis(N-butyl-N-methylamino)imidazol-1-ylphosphine sulfide, cupric chloride 1:1 complex with (N-butyl-N-methylamino)(diethylamino)imidazol-1-ylphosphine sulfide, cupric bromide 1:1 complex with bis(diethylamino)imidazol-1-ylphosphine sulfide, cupric sulfate 1:2 complex with (N-benzyl-N-methylamino)diimidazol-1-ylphosphine sulfide, zinc chloride 1:1 complex with (1,2,3,6-tetrahydro-1-pyridyl)diimidazol-1-ylphosphine sulfide, cupric chloride 1:1 complex with (diethylamino)(phenoxy)imidazol-1-ylphosphine sulfide, cobalt chloride 1:2 complex with (N-benzyl-N-methylamino)diimidazol-1-ylphosphine sulfide, cupric bromide 1:2 complex with (N-benzyl-N-methylamino)(pyrrolidin - 1 - yl)imidazol-1-ylphosphine sulfide, zinc chloride 1:1 complex with (N-benzyl-N-methylamino)diimidazol-1-ylphosphine sulfide, cupric 2-hydroxy-1-naphthalenesulfonate 1:4 complex with bis(dimethylamino)imidazol - 1 - ylphosphine sulfide, ferrous chloride 1:2 complex with (dimethylamino)diimidazol-1-ylphosphine sulfide, ferrous chloride 1:2 complex with (diethylamino)diimidazol - 1 - ylphosphine sulfide, cupric bromide 1:2 complex with (diethylamino)diimidazol-1-ylphosphine sulfide, manganese chloride 1:2 complex with (N-benzyl-N-methylamino)diimidazol-1-ylphosphine sulfide, cupric chloride 1:2 complex with (N-furfuryl-N-methylamino)diimidazol - 1 - ylphosphine sulfide, cupric chloride 1:2 complex with (N-butyl-N-methylamino)diimidazol-1-ylphosphine sulfide.

EXAMPLE 66

90 parts by weight of cupric sulfate 1:2 complex with bis(dimethylamino)imidazol-1-ylphosphine sulfide is finely ground with 10 parts by weight of a sorbitan monolaurate polyoxyethylene derivative to prepare a water-dispersible composition which also can be employed according to the foregoing teachings. In a similar manner, other compositions are prepared by employing one of the following in place of the cupric sulfate 1:2 complex with bis(dimethylamino)imidazol-1-ylphosphine sulfide: nickel sulfate 1:1 complex with bis(N-butyl-N-methylamino)imidazol-1-ylphosphine sulfide, cadmium iodide 1:2 complex with (N-benzyl-N-methylamino)diimidazol-1-ylphosphine sulfide, manganese sulfate 1:2 complex with (N-benzyl-N-methylamino)diimidazol-1-ylphosphine sulfide, cupric chloride 1:1 complex with (diethylamino)(1,2,3,6-tetrahydro-1-pyridyl)imidazol-1-ylphosphine sulfide, cupric bromide 1:2 complex with (N-benzyl-N-methylamino)diimidazol-1-ylphosphine sulfide, manganese chloride 1:4 complex with (dimethylamino)(pyrrolidin-1-yl)imidazol-1-ylphosphine sulfide, cupric chloride 1:1 complex with bis(dimethylamino)imidazol-1-ylphosphine sulfide, cupric chloride 1:1 complex with (dipiperidino)imidazol-1-ylphosphine sulfide, cupric chloride 1:2 complex with (N-benzyl-N-methylamino)phenylimidazol-1-ylphosphine sulfide, zinc chloride 1:1 complex with (dimethylamino)diimidazol-1-ylphosphine sulfide, cupric chloride 1:1 complex with (diethylamino)(piperidino)imidazol-1-ylphosphine sulfide, cupric chloride 1.1 complex with bis(diethylamino)imidazol - 1 - ylphosphine sulfide, cupric benzoate 1:1 complex with bis(dimethylamino)imadazol-1-ylphosphine sullde, cupric nitrate 1:4 complex with bis(dimethylamino)imidazol - 1 - ylphosphine sulfide, zinc chloride 1:1 complex with (piperidino)diimidazol-1-ylphosphine sulfide, magnanese chloride 1:2 complex with (N - butyl - N - methylamino)diimidazol - 1 - ylphosphine sulfide, maganese chloride 1:2 complex with bis(dimethylamino)imidazol - 1 - ylphosphine sulfide, cadmium chloride 1:2 complex with (N - benzyl-N-methylamino)diimidazol - 1 - ylphosphine sulfide, cupric chloride 1:1 complex with (pyrrolidin-1-yl)(piperidino)imidazol-1-ylphosphine sulfide.

EXAMPLE 67

In other procedures, aqueous compositions are prepared by mixing and grinding together in a ballmill 0.06 part by weight of one of the present metal salt complexes, 0.06 part of an alkyl aryl sulfonate, 0.06 part of a substituted benzoic alkylsulfonic acid, and 200 parts of water. In this manner, compositions are formulated with each of: zinc chloride 1:1 complex with (N-furfuryl-N-methylamino)diimidazol-1-ylphosphine sulfide, zinc iodide 1:1 complex with (N-benzyl-N-methylamino)diimidazol-1-ylphosphine sulfide, zinc sulfate 1:2 complex with (N-benzyl-N-methylamino)diimidazol-1-ylphosphine sulfide, cupric chloride 1:1 complex with (dimethylamino)pyrrolidin-1-ylimidazol-1-ylphosphine sulfide, nickel fluoride 1:1 complex with (dimethylamino)(cyclohexyl)imidazol-1-ylphosphine sulfide, cobalt formate 1:1 complex with (ethoxy)diimidazol-1-ylphosphine sulfide, cupric bromide 1:1 complex with (diethylamino)styrylimidazol-1-ylphosphine sulfide, cadium benzoate 1:1 complex with (N-(tetrahydrofurfuryl) - N - methylamino)diimidazol-1-ylphosphine sulfide, cupric chloride 1:1 complex with (diethylamino)(N(4 - pyridylmethyl) - N - methylamino)imidazol-1-ylphosphine sulfide, cupric tartrate 1:1 complex with triimidazol-1-ylphosphine sulfide, cupric chloride 1:1 complex with (diethylamino)(morpholino)imidazol-1-ylphosphine sulfide, ferrous lactate 1:1 complex with (N-phenethyl-N-methylamino)(1,2,4 - triazol-1-yl)imidazol-1-ylphosphine sulfide, cupric chloride 1:1 complx with (dimethylamino)pyrazol-1-ylimidazol-1-ylphosphine sulfide, cupric sulfate 1:1 complex with (diethylamino)(2-naphthoxy)imidazol-1-ylphosphine sulfide, manganese valerate 1:1 complex with bis(1,2,3-triazol-1-yl)imidazol-1-ylphosphine sulfide, zinc chloride 1:1 complex with (dimethylamino)(methyl)imidazol - 1 - ylphosphine sulfide, zinc stearate 1:1 complex with (dimethylamino)-(n-butoxy)imidazol-1-ylphosphine sulfide, cupric chloride 1:1 complex with (diethylamino)(2-naphthoxy)imidazol-1-ylphosphine sulfide.

EXAMPLE 68

In a first series of operations, various of the metal salt complexes of the present invention were employed for the control of tomato late blight on young tomato plants. In these operations, each of the complexes were separately formulated as an aqueous dispersion thereof, using a minor amount of acetone or isopropanol, as well as a minor amount of a wetting agent to facilitate dispersion of the active compound into the water. The concentration of the respective complex in each formulation was 100 parts thereof per million parts by weight of total composition. Each of the solutions was applied to a separate plot of young tomato plants; and all of the plots so treated as well as another plot of plants left untreated to serve as a control, were inoculated with tomato late blight fungus (*Phytophthora infestans*). All plots were stored in a humidity chamber to assure optimal conditions for development of the late blight disease. After the disease was observed to have become well established on the control plants, the treated plants were examined to determine control, if any, of the disease. With the control plots as 0 percent control, and the absence of disease symptoms as 100 percent control, the treated plots were rated. The results are set forth in the following table.

| Compound evaluated | Percent control of *Phytophthora infestans* |
|---|---|
| Zinc chloride 1:1 complex with (N-benzyl-N-methyl-amino) diimidazol-1-ylphosphine sulfide | 95 |
| Zinc chloride 1:2 complex with bis (dimethylamino)-imidazol-1-ylphosphine sulfide | 90 |
| Manganese chloride 1:2 complex with (N-benzyl-N-methylamino)diimidazole-1-ylphosphine sulfide | 100 |
| Cupric chloride 1:1 complex with bis(dimethylamino)-imidazol-1-ylphosphine sulfide | 100 |
| Cupric sulfate 1:2 complex with (N-benzyl-N-methyl-amino)diimidazol-1-ylphosphine sulfide | 99 |
| Zinc sulfate 1:2 complex with (N-benzyl-N-methyl-amino)diimidazol-1-ylphosphine sulfide | 100 |
| Zinc chloride 1:1 complex with (dimethylamino)-diimidazol-1-ylphosphine sulfide | 90 |
| Zinc chloride 1:1 complex with (diethylamino)-diimidazol-1-ylphosphine sulfide | 99 |
| Zinc chloride 1:1 complex with (N-furfuryl-N-methyl-amino)diimidazol-1-ylphosphine sulfide | 99 |
| Cupric sulfate 1:2 complex with bis(dimethylamino)-imidazol-1-ylphosphine sulfide | 75 |
| Manganese chloride 1:2 complex with (N-furfuryl-N-methylamino)diimidazol-1-ylphosphine sulfide | 95 |
| Cadium chloride 1:2 complex with (N-benzyl-N-methyl-amino)diimidazol-1-ylphosphine sulfide | 75 |
| Zinc iodide 1:1 complex with (N-benzyl-N-methylamino)-diimidazol-1-ylphosphine sulfide | 90 |
| Manganese sulfate 1:2 complex with (N-benzyl-N-methyl-amino)diimidazol-1-ylphosphine sulfide | 90 |
| Cupric bromide 1:2 complex with (N-benzyl-N-methyl-amino)diimidazol-1-ylphosphine sulfide | 90 |
| Cupric nitrate 1:4 complex with bis(dimethylamino)-imidazol-1-ylphosphine sulfide | 90 |
| Cadium iodide 1:2 complex with (N-benzyl-N-methyl-amino)diimidazol-1-ylphosphine sulfide | 75 |
| Ferrous chloride 1:2 complex with (diethylamino)diimid-azol-1-ylphosphine sulfide | 83 |
| Manganese chloride 1:4 complex with (dimethylamino)(1-pyrrolidin-1-yl)imidazol-1-ylphosphine sulfide | 90 |
| Cupric butyrate 1:1 complex with bis(dimethylamino) -imidazol-1-ylphosphine sulfide | 87 |
| Cupric bromide 1:2 complex with (diethylamino)diimid-azol-1-ylphosphine sulfide | 100 |
| Cupric benzenesulfonate 1:4 complex with bis(dimethyl-amino)imidazol-1-ylphosphine sulfide | 95 |
| Cupric chloride 1:2 complex with (N-butyl-N-methyl-amino)diimidazol-1-ylphosphine sulfide | 90 |
| Cupric bromide 1:2 complex with (N-benzyl-N-methyl-amino)(1-pyrrolidin-1-yl)imidazol-1-ylphosphine sulfide | 90 |

EXAMPLE 69

In another series of operations, various of the metal salt complexes of the present invention were evaluated for the control of apple scab (*Venturia inaqualis*) on young apple plants. The evaluations were carried out as described in the immediately preceding example except that each complex evaluated was present in the formulation in a concentration of 25 parts thereof per million parts by weight of total concentration.

The results are set forth in the following table.

| Compound evaluated | Percent control of apple scab |
|---|---|
| Manganese chloride 1:2 complex with bis(dimethylamino) imidazol-1-ylphosphine sulfide | 90 |
| Cupric chloride 1:2 complex with (N-benzyl-N-methyl-amino) diimidazol-1-ylphosphine sulfide | 95 |
| Zinc chloride 1:1 complex with (1,2,3,6-tetrahydro-1-pyridyl)diimidazol-1-ylphosphine sulfide | 83 |
| Cupric chloride 1:2 complex with (N-butyl-N-methyl-amino)diimidazol-1-ylphosphine sulfide | 90 |

EXAMPLE 70

In another series of operations, various metals salt complexes were employed for residual control of late blight of potato. In these operations, each of the given compounds were separately formulated as a wettable powder composition containing 25 percent by weight of the active compound and the powder thereafter dispersed in several portions of water to obtain a series of treating formulations of each of the compounds, the concentration of compound varying in the formulations. Each formulation was then applied as a spray to a separate stand of potato plants, application being to the point of run-off. Thereafter, the various treated stands were held for 4 days, then inoculated with *Phytophthora infestans* and maintained under conditions conducive to the development of the disease. Similar stands of untreated potato plants were inoculated and maintained in the same fashion to serve as checks. Five days after the inoculation, the stands were evaluated for control, complete control being rated as 100 percent and the level of infestation in the control stand being rated as 0 percent. The results are summarized in the following table in terms of the concentration, expressed as parts by weight of active complex per million parts of treating formulation (p.p.m.), found to give at least 90 percent control of the late blight organism.

| Complex evaluated | P.p.m. of complex [1] |
|---|---|
| Zinc chloride 1:1 complex with (N-benzyl-N-methylamino) diimidazol-1-ylphosphine sulfide | 19 |
| Cupric chloride 1:2 complex with (N-benzyl-N-methyl-amino)diimidazol-1-ylphosphine sulfide | 5 |
| Ferrous chloride 1:2 complex with (N-benzyl-N-methyl-amino) diimidazol-1-ylphosphine sulfide | 19 |
| Manganese chloride 1:2 complex with (N-benzyl-N-methyl-amino)diimidazol-1-ylphosphine sulfide | 19 |

[1] Giving at least 90 percent control.

EXAMPLE 71

Various of the present metal salt complexes were employed for control and residual control of tomato late blight. In these operations, each of the compounds was formulated as a wettable powder composition containing 50 percent by weight of the active compound and the resulting composition dispersed in several portions of water to obtain a plurality of aqueous spray formulations, each with a different concentration of the respective compound therein. The host plants were young tomato plants. Inoculation with tomato late blight was carried out at varying times with respect to application of the various treating formulations. In one series, inoculation was accomplished following application of the treating formulation. In a second series, inoculation was carried out two days after treatment; and in a third series, four days, and in a fourth series, six days after treatment. Untreated check plants were similarly inoculated and all plants were maintained under growing conditions conducive to the development of late blight. Plants were evaluated for late blight control five days after inoculation, rating being made on the basis of 0 percent for the level of control on the corresponding check plants to 100 percent for complete control.

The results of these various operations, expressed as the concentration in parts per million of the active compounds giving a control rating of at least 90 percent, are set forth in the following table.

|  | Concentration (p.p.m.) of complex giving at least 90 percent control of tomato blight | | | |
|---|---|---|---|---|
| Complex evaluated | First series, inoculation immediately after treatment | Second series, inoculation two days after treatment | Third series, inoculation four days after treatment | Fourth series, inoculation six days after treatment |
| Zinc chloride 1:1 complex with (benzylmethylamino)diimidazol-1-ylphosphine sulfide | 1.25 | 5 | 5 | 19 |
| Cupric chloride 1:2 complex with (benzylmethylamino)diimidazol-1-ylphosphine sulfide | 1.25 | 19 | 5 | 19 |
| Ferrous chloride 1:2 complex with (benzylmethylamino)diimidazol-1-ylphosphine sulfide | 1.25 | 5 | 19 | 19 |
| Manganese chloride 1:2 complex with (benzylmethylamino)diimidazol-1-ylphosphine sulfide | 1.25 | 19 | 19 | 19 |

EXAMPLE 72

Various of the present metal salt complexes were employed for the control and residual control of rice blast. In these operations, each of the complexes was formulated as a wettable powder composition containing 50 percent by weight of the active complex and the resulting compositions were dispersed in water at various dosages to produce a plurality of aqueous spray formulations, each with a different concentration of the respective active complex therein. Each spray formulation was applied so as to wet thoroughly a separate plot of young rice seedlings. Inoculation with viable spores of the rice blast organism *Piricularia oryzae* was carried out at varying times with respect to application of the various treating formulations. In one series, inoculation was accomplished immediately following application of the spray formulations. In a second series, inoculation was carried out 3 days after treatment. Similar plots of untreated rice plants were similarly inoculated to serve as checks. Plants were evaluated for rice blast control 10 days after inoculation, grading being made on the basis of 0 percent for the level of control on the check stands of plants to 100 percent for complete control. Results of these various operations are set forth in the following table, wherein the reported values are concentrations in parts per million giving at least 90 percent control of rice blast.

|  | P.p.m. of complex giving at least 90 percent control of rice blast | |
|---|---|---|
| Complex evaluated | First series, inoculation immediately after treatment | Second series, inoculation 3 days after treatment |
| Cupric bromide 1:1 complex with (diethylamino)(1,2,3,6-tetrahydro-1-pyridyl)imidazol-1-ylphosphine sulfide | 150 | 600 |
| Nickel sulfate 1:1 complex with bis(N-butyl-N-methylamino)imidazol-1-ylphosphine sulfide | 300 | 1,200 |
| Cupric sulfate 1:1 complex with bis(N-butyl-N-methylamino)imidazol-1-ylphosphine sulfide | 300 | 1,200 |
| Cadmium chloride 1:1 complex with bis(N-butyl-N-methylamino)imidazol-1-ylphosphine sulfide | 300 | 1,200 |
| Cupric chloride 1:1 complex with (diethylamino)(N-butyl-N-methylamino)imidazol-1-ylphosphine sulfide | 150 | 150 |
| Cupric bromide 1:1 complex with (diethylamino)(piperidino)imidazol-1-ylphosphine sulfide | 150 | 150 |
| Cupric chloride 1:1 complex with (diethylamino)(piperidino)imidazol-1-ylphosphine sulfide | 150 | 150 |
| Cupric chloride 1:1 complex with (piperidino)(pyrrolidin-1-yl)imidazol-1-ylphosphine sulfide | 600 | 2,400 |
| Cupric bromide 1:1 complex with bis (diethylamino)imidazol-1-ylphosphine sulfide | 600 | 600 |

The uncomplexed imidazolylphosphonothioates to be employed as starting materials in the preparation of the present metal salt complexes are themselves prepared by the procedures taught in U.S. Pats. 3,111,525; 3,111,526; 3,264,179 and 3,323,990. In one such procedure a phosphorothioic chloride compound of the formula

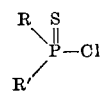

wherein R and R' have the aforementioned significance is reacted with an equimolar proportion of imidazole at a temperature of from 25° to 60° C. in an inert organic solvent and in the presence of a hydrogen chloride acceptor such as triethylamine. The product is isolated and purified by conventional procedures.

We claim:
1. Compound of the formula

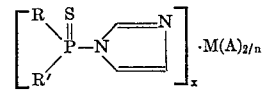

wherein R represents morpholino, piperidino, pyrrolidin-1-yl, 1,2,3,6-tetrahydro-1-pyridyl, imidazol-1-yl, pyrazol-1-yl, 1,2,3-triazol-1-yl, 1,2,4-triazol-1-yl, or radical of the formula

wherein G represents alkyl and G' represents phenyl, benzyl, phenethyl, furfuryl, tetrahydrofurfuryl, 4-pyridylmethyl or alkyl such that G and G' taken together contain from 2 to 13 carbon atoms; R' represents R, diallylamino, loweralkyl, cyclohexyl, phenyl, styryl, naphthyl, alkoxy, having from 1 to 12 carbon atoms, phenoxy, or naphthoxy; M represents a divalent metal selected from the group consisting of cadmium, cobalt, copper, iron, manganese, nickel, and zinc; A represents a phytologically acceptable anion of valence n and x is an integer having the value of 1 to 4, inclusive.

2. A compound of claim 1 wherein M represents copper.

3. The compound of claim 1 which is zinc chloride 1:1 complex with (N-benzyl-N-methylamino)diimidazol-1-ylphosphine sulfide.

4. The compound of claim 1 which is cupric chloride 1:2 complex with (N-benzyl-N-methylamino)diimidazol-1-ylphosphine sulfide.

5. The compound of claim 1 which is ferrous chloride 1:2 complex with (N-benzyl-N-methylamino)diimidazol-1-ylphosphine sulfide.

6. The compound of claim 1 which is manganese chloride 1:2 complex with (N - benzyl - N-methylamino) diimidazol-1-ylphosphine sulfide.

7. The compound of claim 1 which is zinc chloride 1:2 complex with bis(dimethylamino)imidazol - 1 - ylphosphine sulfide.

8. The compound of claim 1 which is manganese chloride 1:2 complex with bis(dimethylamino)imidazol-1-ylphosphine sulfide.

9. Method for inhibiting the growth of bacteria and fungi in a locus subject to infestation by the same which comprises treating the locus with an antimicrobial amount of a metal salt complex of the formula

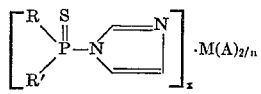

wherein R represents morpholino, piperidino, pyrrolidin-1-yl 1,2,3,6 - tetrahydro-1-pyridyl, imidazol-1-yl, pyrozol-1-yl, 1,2,3, - triazol - 1 - yl, 1,2,4-triazol-1-yl, or radical of the formula

where G represents alkyl and G' represents phenyl, benzyl, phenethyl, furfuryl, tetrahydrofurfuryl, 4-pyridylmethyl or alkyl such that G and G' taken together contain from 2 to 13 carbon atoms; R' represents R, diallyamino, loweralkyl, cyclohexyl, phenyl, styryl, naphthyl, alkoxy having from 1 to 12 carbon atoms, phenoxy or naphthoxy; M represents a divalent metal selected from the group consisting of cadmium, cobalt, copper, iron, manganese, nickel, and zinc; A represents a phytologically acceptable anion of valence $n$ and $x$ is an integer having the value of 1 to 4, inclusive.

10. The method of claim 9 in which the metal salt complex is cupric chloride 1:1 complex with (diethylamino)-(morpholino)imidazol-1-ylphosphine sulfide.

11. The method of claim 9 in which the metal salt complex is cupric bromide 1:2 complex with (N-benzyl-N-methylamino)(pyrrolidin-1-yl)imidazol - 1 - ylphosphine sulfide.

12. The method of claim 9 in which the metal salt complex is cupric chloride 1:1 complex with (dipiperidino)-imidazol-1-ylphosphine sulfide.

13. The method of claim 9 in which the metal salt complex is cupric chloride 1:1 complex with (dimethylamino)(N-phenyl-N-methylamino)imidazol - 1 - ylphosphine sulfide.

14. The method of claim 9 in which the metal salt complex is copper sulfate 1:1 complex with (diethylamino)-(2-naphthoxy)imidazol-1-ylphosphine sulfide.

15. The method of claim 9 in which the metal salt complex is manganese chloride 1:2 complex with bis(dimetrylamino)imidazol-1-ylphosphine sulfide.

16. Composition useful for inhibiting the growth of bacteria and fungi comprising a metal salt complex in intimate mixture with from 0.1 to 20 percent by weight of a dispersing agent, said metal salt complex being of the formula

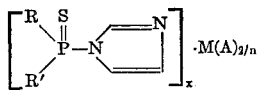

wherein R represents morpholine, piperidino, pyrrolidin-1-yl, 1,2,3,6-tetrahydro-1-pyridyl, imidazol-1-yl, pyrazol-1-yl, 1,2,3 - triazol-1-yl, 1,2,4-triazol-1-yl, or radical of the formula

wherein G represents alkyl and G' represents phenyl, benzyl, phenethyl, furfuryl, tetrahydrofurfuryl, 4-pyridylmethyl or alkyl such as G and G' taken together contain from 2 to 13 carbon atoms, inclusive; R' represents R, alkyl, cyclohexyl, phenyl, styryl, naphthyl, alkoxy having from 1 to 12 carbon atoms, phenoxy or naphthoxy; M represents a divalent metal selected from the group consisting of cadmium, cobalt, copper, iron, manganese, nickel, and zinc; A represents a phytologically acceptable anion of valence $n$ and $x$ is an integer having the value of 1 to 4, inclusive.

17. An aqueous dispersion of the composition of claim 16 wherein the metal salt complex is present in such composition in an amount of at least 0.0001 percent by weight.

18. Composition useful for inhibiting the growth of bacteria and fungi comprising from 2 to 98 percent by weight of a metal salt complex in intimate admixture with a finely divided inert solid, said metal salt complex being of the formula

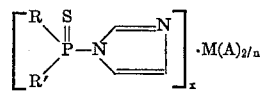

wherein R represents morpholino, piperidino, pyrrolidin-1-yl, 1,2,3,6-tetrahydro-1-pyridyl, imidazol-1-yl, pyrazol-1-yl, 1,2,3 - triazol-1-yl, 1,2,4-triazol-1-yl, or radical of the formula

wherein G represents alkyl and G' represents phenyl, benzyl, phenethyl, furfuryl, tetrahydrofurfuryl, 4-pyridylmethyl or alkyl such that G and G' taken together contain from 2 to 13 carbon atoms, inclusive; R' represents R, allyl, cyclohexyl, phenyl, styryl, naphthyl, alkoxy having from 1 to 12 carbon atoms, phenoxy or naphthoxy; M represents a divalent metal selected from the group consisting of cadmium, cobalt, copper, iron, manganese, nickel, and zinc; A represents a phytologically acceptable anion of valence $n$ and $x$ is an integer having the value of 1 to 4, inclusive.

References Cited
UNITED STATES PATENTS

| | | | |
|---|---|---|---|
| 2,581,905 | 1/1952 | Carr et al. | 260—242 |
| 2,900,295 | 8/1959 | Stone | 260—299 |
| 3,264,179 | 8/1966 | Budde et al. | 260—309 |

STANLEY J. FRIEDMAN, Primary Examiner

U.S. Cl. X.R.

260—20, 242, 279

PO-1050
(5/69)

UNITED STATES PATENT OFFICE
CERTIFICATE OF CORRECTION

Patent No. 3,632,755          Dated 4 January 1972

Inventor(s) Cleve A. Goring and Robert L. Noveroske

It is certified that error appears in the above-identified patent and that said Letters Patent are hereby corrected as shown below:

Column 3, line 21, delete "caused" and insert --causes--.
            line 44, delete "alkoky" and insert --"alkoxy"--.
            line 67, delete "dithiocarbanic" and insert --dithiocarbamic--.
Column 5, line 37, delete "1=1" and insert --1:1--.
Column 6, line 6, delete "M.P.713-4°C." and insert --M.P.173-4°C.
            line 44, delete "M.W.425." and insert --M.W.325.--.
Column 8, line 50, delete "or" and insert --of--.
Column 10, line 21, delete "sullde," and insert --sulfide,--.
            line 51, delete "cadium" and insert --cadmium--.
Column 12, line 63, insert --immediately-- between "complished" and "following
Column 15, line 26, delete "where" and insert --wherein--.
            line 30, delete "diallyamino," and insert --diallylamino,--.
            line 57, delete "metrylamino)" and insert --methylamino)--.
Column 16, line 11, delete "as" and insert --that--.

Signed and sealed this 18th day of July 1972.

(SEAL)
Attest:

EDWARD M. FLETCHER, JR.
Attesting Officer

ROBERT GOTTSCHALK
Commissioner of Patents